United States Patent
Umeda

(10) Patent No.: US 7,209,653 B2
(45) Date of Patent: Apr. 24, 2007

(54) PHOTOGRAPHIC IMAGE SERVICE SYSTEM

(75) Inventor: Tomoaki Umeda, Kaisei-machi (JP)

(73) Assignee: Fujifilm Corporation, Kanagawa-Ken (JP)

( * ) Notice: Subject to any disclaimer, the term of this patent is extended or adjusted under 35 U.S.C. 154(b) by 685 days.

(21) Appl. No.: 10/724,889

(22) Filed: Dec. 2, 2003

(65) Prior Publication Data
US 2004/0184077 A1 Sep. 23, 2004

(30) Foreign Application Priority Data
Dec. 3, 2002 (JP) ............................. 2002-351076

(51) Int. Cl.
G03B 27/00 (2006.01)
(52) U.S. Cl. ..................... 396/661; 358/1.15; 355/40
(58) Field of Classification Search ............... 396/429, 396/661; 355/40; 358/1.15
See application file for complete search history.

(56) References Cited
U.S. PATENT DOCUMENTS

2002/0093680 A1* 7/2002 Tanaka ..................... 358/1.15
2002/0140975 A1* 10/2002 Tanaka ..................... 358/1.15
2006/0250646 A1* 11/2006 Kito ......................... 358/1.15

* cited by examiner

Primary Examiner—W. B. Perkey
(74) Attorney, Agent, or Firm—Birch, Stewart, Kolasch & Birch, LLP

(57) ABSTRACT

Photographic images of local area events are efficiently provided. Each of a plurality of laboratories obtains photographic images of events in their local areas and uploads the images to a management server. The management server stores the images, correlated with area specifying data that specifies the location of the laboratory which has uploaded them. A user transmits the zip code of an area in which an event for which he desires photographic images was held, via an Internet television set. The management server searches for images uploaded by a laboratory in an area that matches the transmitted zip code, and transmits the images to the Internet television set. The user selects desired images. Then, the management server generates and transmits an output command that causes a laboratory to print the images selected by the user.

8 Claims, 14 Drawing Sheets

| LAB ID 1 | | LAB ID 2 | . . . . . . . . . . . . . . . . . . . |
|---|---|---|---|
| EVENT1 | IMAGE 1 | : | : |
| | IMAGE 2 | : | : |
| | : | : | : |
| EVENT2 | IMAGE 1 | : | : |
| | IMAGE 2 | : | : |
| | : | : | : |
| : | : | : | : |
| : | : | | |

DATA A

| EVENT NAME | ELEMENTARY SCHOOL A ATHLETIC EVENT | |
|---|---|---|
| PROGRAM | 9:00~9:30 | OPENING CEREMONY |
| | 9:30~10:30 | BASKET BALL |
| | ⋮ | ⋮ |
| | 15:00~15:20 | CLOSING CEREMONY |

FIG.11A

DATA B

| EVENT NAME | ELEMENTARY SCHOOL A ATHLETIC EVENT |
|---|---|
| SUB-EVENT | IMAGE |
| OPENING CEREMONY | IMAGE1,IMAGE2, · · · · IMAGE15, |
| BASKET BALL | IMAGE6,IMAGE7, · · · · IMAGE34, |
| ⋮ | ⋮ |
| CLOSING CEREMONY | IMAGE140,IMAGE141, · · · · IMAGE150 |

| LAB ID 1 | | LAB ID 2 | . . . . . . . . . . . . . . . . . . . . . . |
|---|---|---|---|
| EVENT1 | DATA A1 | ⋮ | ⋮ |
| | DATA B1 | | |
| | ⋮ | | |
| EVENT2 | DATA A2 | | |
| | DATA B2 | | |
| | ⋮ | | |
| ⋮ | ⋮ | | |

PHOTOGRAPHIC IMAGE SERVICE SYSTEM

This Nonprovisional application claims priority under 35 U.S.C. §119 (a) on Patent Application No (s). 2002-351076 filed in JAPAN on Dec. 3, 2002, the entire contents of which are hereby incorporated by reference.

BACKGROUND OF THE INVENTION

1. Field of the Invention

The present invention relates to a photographic image service. Particularly, the present invention relates to a photographic image service system that provides photographic images of local area events to users.

2. Description of the Related Art

Accompanying the spread of the Internet, it has become a widespread practice to place orders online. These orders include accessing a server on the Internet using a personal computer (hereinafter, referred to as "PC") while at home to shop, as well as performing bank transactions. In addition, portable terminals such as cellular telephones have also become rapidly widespread. It is an everyday occurrence to access servers on the Internet by using the portable terminals in the same manner as a PC. Further, with the recent introduction of Internet Television, systems for providing various services utilizing a specific channel of the television are also being realized.

Among these systems, there are those that provide services related to photographic images. For example, known systems include those that digitize photographic images obtained by a user then store the digitized image data in an image server; provide the digitized image data to the user, recorded on a recording medium such as a CD-R; and enable users to order prints of photographic images stored in the image server, via a network. There are known systems in which a user stores their own image data on a server on a network, and is enabled to place printing orders on the stored image data. For example, in the photographic image service system disclosed in U.S. Patent Laid-Open No. 20020093680, a user transmits their own image data to a server provided by a service provider, via a network such as the Internet. The server stores the image data transmitted thereto from the user, and also provides a printing order reception service wherein printing orders are received for the image data which are stored therein. In these systems, the contents of the printing order received by the server (the image or images to be printed, the print size, etc.) are transmitted to a laboratory that actually performs the printing. Note that there are cases in which the same service provider provides both the laboratory that actually performs printing and the server that stores and receives printing orders for image data, and cases in which the laboratory and the server are provided by different service providers.

Meanwhile, there are cases in which it is difficult for a user to obtain photographs for him or herself, due to geographical or time constraints. In response to these situations, systems exist in which photographic images, for example, of World Cup Soccer games, are exhibited on the Internet. Users order desired photographic images in the form of prints, or as data recorded in a recording medium, from among those exhibited on the Internet. By utilizing such systems, users are enabled to obtain photographic images which would be difficult to obtain by themselves. In addition, photographic images provided in these systems are photographed by professional photographers. Therefore, users are able to obtain photographic images of a higher quality than those that they would be able to photograph themselves.

However, systems for providing professionally photographed, high quality photographic images of events to users have as their targets large scale events of national to international importance. In the case of small scale events of importance only to a limited geographic area, such as a school athletic event or a town festival, photography is generally performed by those involved with the participants (parents, groups of friends, etc.). In this case, not only is securing photography locations troublesome, but as the photography is performed by amateurs, it is difficult to obtain high quality photographic images. Therefore, organizers of an event, for example, may commission a local photo studio to perform photography at the event. The photo studio prints out the photographic images for viewing by the participants, who order additional prints for photographic images that they desire. In this method, there is a problem that only participants in the event can obtain photographic images thereof. Only the photo studio which has been commissioned can perform photography and printing. Therefore, there is no competition among photo studios, and there is a problem that the users have limited freedom of choice regarding the photo studio.

In the case that a user desires photographs of their grandchild's elementary school athletic event, and the grandchild lives far away, the user must rely on photographs sent to them from their children, which is inconvenient. Photographs of small scale events, which are of importance only to a limited community such as that described above, are sometimes exhibited on personal web sites. However, these web sites are difficult to search for, and there is no guarantee regarding the quality of the photographic images. A method wherein the local photo studio exhibits the photographic images on the Internet to receive orders therethrough is unrealistic, because the burden on the photo studio is great from the viewpoint of costs in system construction and maintenance.

SUMMARY OF THE INVENTION

The present invention has been developed in view of the above circumstances. It is an object of the present invention to provide a photographic image service system that efficiently provides users with photographic images of small scale events that occur in local areas.

The photographic image service system of the present invention comprises: a plurality of service shops for providing a photographic image service; at least one order terminal; and a management server; all connected via a network, wherein:

each of the service shops comprises:

an uploading means for uploading at least one photographic image of an event which occurs in its local area to the management server; and an output means for outputting at least one photographic image of the event specified by an output command issued by the management server;

the management server comprises:

a memory means for recording the at least one photographic image of the event, correlated with area specifying data that specifies an area where the service shop, which has uploaded the at least one photographic image, is located;

a search means for searching the memory means for the at least one photographic image of the event uploaded by a service shop which is designated by area designating data received from the order terminal;

an image exhibiting means for transmitting the at least one photographic image found by the search means to the order terminal; and an output control means for transmitting output commands that cause at least one photographic image, specified by image specifying data transmitted from the order terminal from among the at least one photographic image of the event transmitted thereto, to be transmitted to a predetermined service shop and output thereat; and each of the at least one order terminal comprises:

an area designating means for designating an area at which at least one photographic image of an event is obtained, by transmitting area designating data, desired by a user, to the management server;

a display means for displaying the at least one photographic image transmitted to the order terminal from the management server; and an image specifying means for transmitting data that specifies at least one photographic image selected by the user from among the at least one photographic image of the event transmitted to the management server, as the image specifying data.

Here, the "photographic image of an event" refers to digital image data representing at least one photographic image related to various events. The contents of the photographic images are mainly those of the progression of the event itself (for example, photographic images of an awards ceremony at an elementary school athletic event). However, any photographic image related to the event (for example, photographic images of the scenery around the elementary school at which the athletic event took place, or photographic images of awards ceremony from previous years) may also be included. In addition, the photographic images of the event may be digital image data obtained by digital cameras, or image data which has been digitized by scanning photographic images which were photographed on film.

The "output means" provided at the service shops include recording devices (e.g., computers) for recording photographic images on recording mediums such as CD-R's, as well printers for printing photographic images, corresponding to the services provided by the service shops.

The "area specifying data" may be any data as long as the location of the service shop, which has uploaded the photographic image of the event, can be specified. For example, the "area specifying data" may be the name of the city, town, or village where the shop is located, the zip code, or the telephone number of the shop. Further, the "area designating data" transmitted from the order terminal to the management server may not necessarily match the format of the "area specifying data", as long as the area of the service shop, recorded in the memory means of the management server, can be designated. For example, even if the "area specifying data" recorded in the memory means for a service shop is the name of the city where the shop is located, the "area designating data" transmitted from the order terminal may be a zip code. In this case, a conversion means for converting the zip code to a city name is provided in the search means of the management server.

In addition, an event such as an "elementary school athletic event" commonly includes a plurality of programs (hereinafter, referred to as "sub-events"), such as "opening ceremony", "basketball", "tug of war", and "award ceremony". It is preferable that the photographic image service system of the present invention adopts a construction wherein:

the memory means records the at least one photographic image of the event, correlated with the sub-event at which the photographic image was obtained;

each of the at least one order terminal further comprises a sub-event specifying means for transmitting sub-event specifying data, which specifies a sub-event desired by a user, to the management server; and the image exhibiting means transmits at least one photographic image of an event which was obtained at the sub-event which is specified by the sub-event specifying data, from among the photographic images of the event which were located by the search means.

In this case, the memory means may record the photographic images of the event in groups. That is, the photographic images maybe directly correlated with the sub-events, in the form: sub-event 1: image 1, image 2, . . . ; sub-event 2: image 1, image 2, . . . . Alternatively, the memory means may employ the time/date of photography of the photographic image of the event and the time/date that the sub-event was held, to record the at least one photographic image of the event, correlated with the sub-event at which the photographic image was obtained. As a further alternative, the memory means may employ the location of photography of the photographic image of the event and the location where the sub-event was held, to record the at least one photographic image of the event, correlated with the sub-event at which the photographic image was obtained.

Note that the photographic image of the event and the sub-event at which the photographic image was obtained need only to be correlated and recorded in the memory means of the management server. The actual correlating operation may be performed in a variety of manners. For example, the management server may perform the correlation automatically, the correlation may be performed by an operator of the management server, or the service shop may perform the correlation when uploading the photographic images of the event. For example, the service shop may upload the photographic images of the event correlated with the sub-events, and the memory means may record the uploaded image data as is. Alternatively, the service shop may upload the photographic images of the event with an event program that indicates the times of the sub-events. In this case, the management server reads out the photography times/dates of the photographic images of the event from tag information thereof, then correlation is performed employing the photography times/dates and the times of the sub-events. In addition, with the recent improvements in the functionality of imaging devices, those with GPS functions are becoming widespread. Taking this into consideration, data that indicates a photography location being included in header information can be taken advantage of. That is, the management server may analyze the tag information of the photographic images, and correlate photographic images which have been obtained at a certain location with a sub-event which was held at the same location.

In addition, the sub-event specifying data may be the time of the sub-event or the location, which was employed in the correlation of the photographic images and the sub-events. However, the sub-event specifying data is not limited thereto. Any data, such as the name of a sub-event, may be used, as long as the data enables the search means to specify the sub-event.

It is preferable that the photographs of the event transmitted from the image exhibiting means of the management server to the order terminal are confirmation images of the original photographs. The "confirmation images" refer to images which enable confirmation of the contents thereof, but are of poorer image quality than the original photographic images of the event. The "confirmation images" may be those of reduced image size, low resolution images obtained by pixel skipping, partially mosaic processed images, or images synthesized with other images (for example, the words "Sample Image" or a mark of the service shop) that affect image quality. Note that the confirmation images may be generated by the management server, or generated at each service shop and uploaded to the management server.

In the photographic service system of the present invention, the output control means of the management server transmits output commands that cause photographic images, specified by a user via the order terminal, to be to be transmitted to a predetermined service shop and output thereat. The "predetermined service shop" is not limited to the service shop that uploaded the selected photographs of the event to the management server. For example, the order terminal may further comprise a shop selecting means for selecting a service shop at which the photographic images are output. In this case, the output control means of the management server causes the photographic images of the image to be output at the service shop selected by the user via the order terminal. Note that the shop selecting means of the order terminal may be provided in any manner, as long as data that specifies the service shop desired by the user is transmitted to the management server. For example, input means such as a keyboard may be employed as the service shop selecting means. In this case, the user directly inputs the name of a desired service shop, area designating data and the like. The management server causes a service shop that matches the criteria input by the user to output the photographic images. Alternatively, the management server may transmit data specifying each of the service shops (shop names, locations, etc.) to the order terminal. In this case, the user selects a desired service shop from among those regarding which data have been transmitted to the order terminal.

A construction of the photographic image service system may be adopted wherein:

each of the order terminals further comprises a subject specifying means for transmitting a characteristic image indicating the characteristics of a target subject;

the management serve further comprises an extracting means for extracting at least one photographic image in which the target subject is pictured, from among the at least one photographic image of the event, based on the characteristic image transmitted from the order terminal; and wherein the image exhibiting means transmits only the at least one photographic image in which the target subject is pictured, extracted by the extracting means, to the order terminal.

Here, the "characteristic image" refers to an image that indicates the characteristics of the target subject. For example, in the case of an athletic event, the characteristic image may be an image of a number cloth having a name and a number written thereon, an image of socks having a special pattern, or an image of a red hat.

The characteristic image is not limited to being one image. A plurality of characteristic images may be employed. The plurality of characteristic images may specify different target subjects respectively. In this case, photographic images of the event having any one of the target subjects pictured therein may be provided to the user, or photographic images of the event having all of the target subjects pictured therein may be provided.

In the case that the target subject is a person, it is preferable that the characteristic image is a photographic image of the person's face.

It is not necessary that the service shops, the management server and the order terminals of the photographic image service system of the present invention be contained in a single housing. The components of the photographic image service system may be provided in separate housings, as long as they are capable of cooperating and fulfilling their functions. For example, the memory means and the search means of the management server may be realized within a single computer, or be realized by separate computers capable of data communication. It is also not necessary that the display means and the subject specifying means of the order terminal are contained within the same housing. For example, the display means may be a television monitor, and the subject specifying means may be an imaging device having communications capabilities, such as a cellular telephone with built in camera.

According to the photographic image service system of the present invention, each of the service shops uploads photographic images of events in their local areas. The management server records photographic images of the events, correlated with area specifying data of the service shops which have uploaded the photographic images. When a user transmits area designating data via the order terminal, the management server exhibits photographic images of the event uploaded by the service shop which is designated by the area designating data by transmitting them to the order terminal. The management server transmits output commands that cause photographic images of the event, specified by the user via the order terminal, to be output at a predetermined service shop. Therefore, users at remote locations from the area where the event was held, as well as local users, can view photographic images of the event simply by inputting area designating data into the order terminal. In addition, the users can order professionally photographed high quality photographic images as prints or recorded on a recording medium, which is convenient for the users.

In addition, the service shops need only to obtain photographic images of events in their local areas and upload them to the management server. The service shops are enabled to receive orders from users without constructing servers themselves. Therefore, the system is convenient for the service shops, and efficient.

A single event commonly includes a plurality of sub-events. Therefore, the management server does not necessarily transmit all of the photographic images of a single event to the order terminal for display thereat. The photographic images of the event may be correlated with the sub-events during which they were obtained. In this case, the management server transmits photographic images of the event obtained during the sub-event which is specified by the sub-event specifying data sent from the order terminal, which is further convenient for the users.

As a manner in which the photographic images of the event are correlated with the sub-events, the photography times of the photographic images of the event and the times of the sub-events may be correlated. In the case that the event is of a type wherein a variety of sub-events are held in sequence at a limited location, such as an elementary school athletic event, a useful service can be provided. For example, the names of the sub-events that constitute the event may be transmitted to the order terminal as an event program. Then, only the photographic images of the event picturing the sub-events, specified by the user via the order terminal, are displayed thereat. By this construction, the necessity of the user to search for photographic images of the event, in which he/she is interested, from among a great number of photographic images, is obviated, which is convenient.

As a manner in which the photographic images of the event are correlated with the sub-events, the photography locations of the photographic images of the event and the locations of the sub-events may be correlated. In the case that the event is of a type wherein a variety of sub-events are held at different locations, such as a town festival, an extremely useful service can be provided. For example, a map of a town at which the festival is held may be transmitted to the order terminal. Then, only the photographic images of the event picturing the sub-events, which are held at locations specified by the user via the order terminal, are displayed thereat, which is convenient.

Regarding the photographic image service system of the present invention, a construction may be adopted wherein confirmation images are transmitted from the management server to the order terminal when exhibiting the photographic images of the event. The confirmation images enable confirmation of the contents of the images, but are of poorer image quality than the original photographic images. Downloading of the original photographic images without payment by users can be prevented, thereby protecting the service shops.

In addition, a construction may be adopted wherein users are enabled to select the service shop which outputs the photographic images of the event. This enables a service shop different from that which has uploaded the photographic images to output the photographic images, which is convenient for the user. For example, in the case that a user A who lives in New York desires prints of photographic images of an athletic event which was held at an elementary school B in Alaska, the user A transmits the zip code of the elementary school B to the management server. The user A views photographic images of the athletic event which have been uploaded by a service shop located in the area of the elementary school B. When placing a printing order for desired images from among the photographic images, if the user A selects a service shop in New York, close to his residence, to perform printing, he is able to receive the prints from his local service shop. In this case, copyrights of the photographic images of the event are granted to the service shop which has uploaded them. The service shop which performs printing of the photographic images pays royalties to the service shop having the copyrights therefor. Thereby, the service shop which performed printing is paid for its printing services, and the service shop which uploaded the photographic images is paid its copyright royalties. There are merits to the photographic image service system for all parties involved, i.e., the users, the service shop which provides the photographic images, and the service shop which outputs the photographic images. Further, by offering discounts when the same service shop which uploaded photographic images is selected to output them, or the like, the variety of services and the selective freedom of users can be improved.

A construction may also be adopted wherein the management server extracts and exhibits only photographic images of an event in which a target subject is pictured, based on a characteristic image of the target subject transmitted thereto by the order terminal. In this case, only photographic images in which the target subject of the user is pictured are provided. Therefore, the necessity to sift through a great number of photographic images to find those in which the target subject is pictured is obviated. For example, in the case that the event is an athletic event at a school, the characteristic image may be that of a number cloth (having a user's child's name and number written thereon) or that of socks having a special pattern. By transmitting such a characteristic image to the management server, the management server provides only those photographic images in which the number cloth or the socks are pictured. Therefore, the photographic service system is convenient for a parent who wishes to obtain only photographs of his own child. Alternatively, in the case that the event is a festival, the characteristic image may be that of a location (a temple or surrounding buildings) at which the event's climax takes place. By transmitting such a characteristic image to the management server, desired photographic images of the event can be searched for easily.

It is often the case that it is convenient for users to employ a photographic image of a person's face as the characteristic image. For example, there is a great possibility that grandparents living far away from their grandchild own a photographic image of their grandchild's face. However, the possibility that they own a photographic image of the clothes that their grandchild wore on the day of his athletic event, or that they own a photographic image of the school, is small. Therefore, by employing a photographic image of the grandchild's face as the characteristic image, photographs of the athletic event in which the grandchild is pictured can be conveniently obtained. Conventionally, a user that participates in an event is unable to take photographs of him/herself. Therefore, it had been necessary to ask a friend to take photographs in advance. Even if the user is pictured in photographs obtained by strangers, it had not been possible to obtain these photographs. According to the photographic image service station of the present invention, a user that participated in an event is enabled to obtain photographs in which he/she is pictured, from among exhibited photographic images of the event, by transmitting a photographic image of his/her face to the management server as a characteristic image.

BRIEF DESCRIPTION OF THE DRAWINGS

FIGS. 11A and 11B show examples of data uploaded by the laboratory of FIG. 10.

FIG. 13 shows an example of the manner in which photographic images of events, which are stored in an image storage means of the management server of FIG. 12, are arranged.

DESCRIPTION OF THE PREFERRED EMBODIMENTS

Hereinafter, an embodiment of the present invention will be described with reference to the attached drawings.

Figure 1:
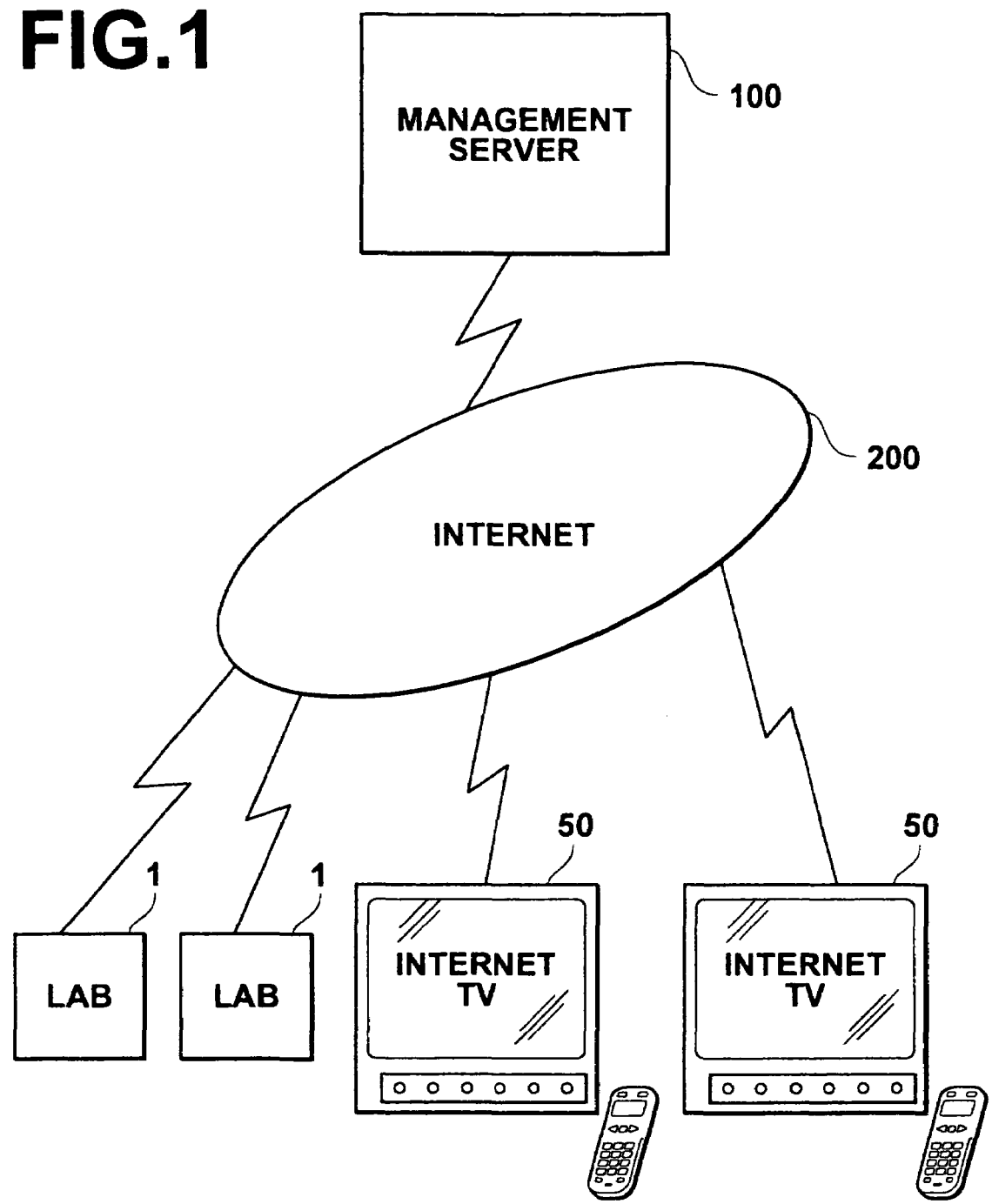
FIG. 1 is a block diagram showing the configuration of a printing system as a first embodiment of the present invention.

FIG. 1 is a block diagram showing the configuration of a printing system as a first embodiment of the present invention. As shown in FIG. 1, the printing system comprises: a plurality of laboratories 1 for uploading photographic images of events that occur in their local areas to a management server 100, and for outputting photographic images as prints according to output commands from the management server 100; Internet television sets 50 that serve as order terminals at which users order prints of photographic images of events via the management server; and the management server 100, for storing the photographic images of the events which are uploaded from each of the laboratories 1, receiving printing orders from users via the Internet television sets 50 regarding the stored photographic images, and transmitting output commands to the laboratories 1 according to the contents of the printing orders to cause the photographic images to be printed. The laboratories 1, the Internet television sets 50, and the management server 100 are connected by the Internet 200.

Figure 2:
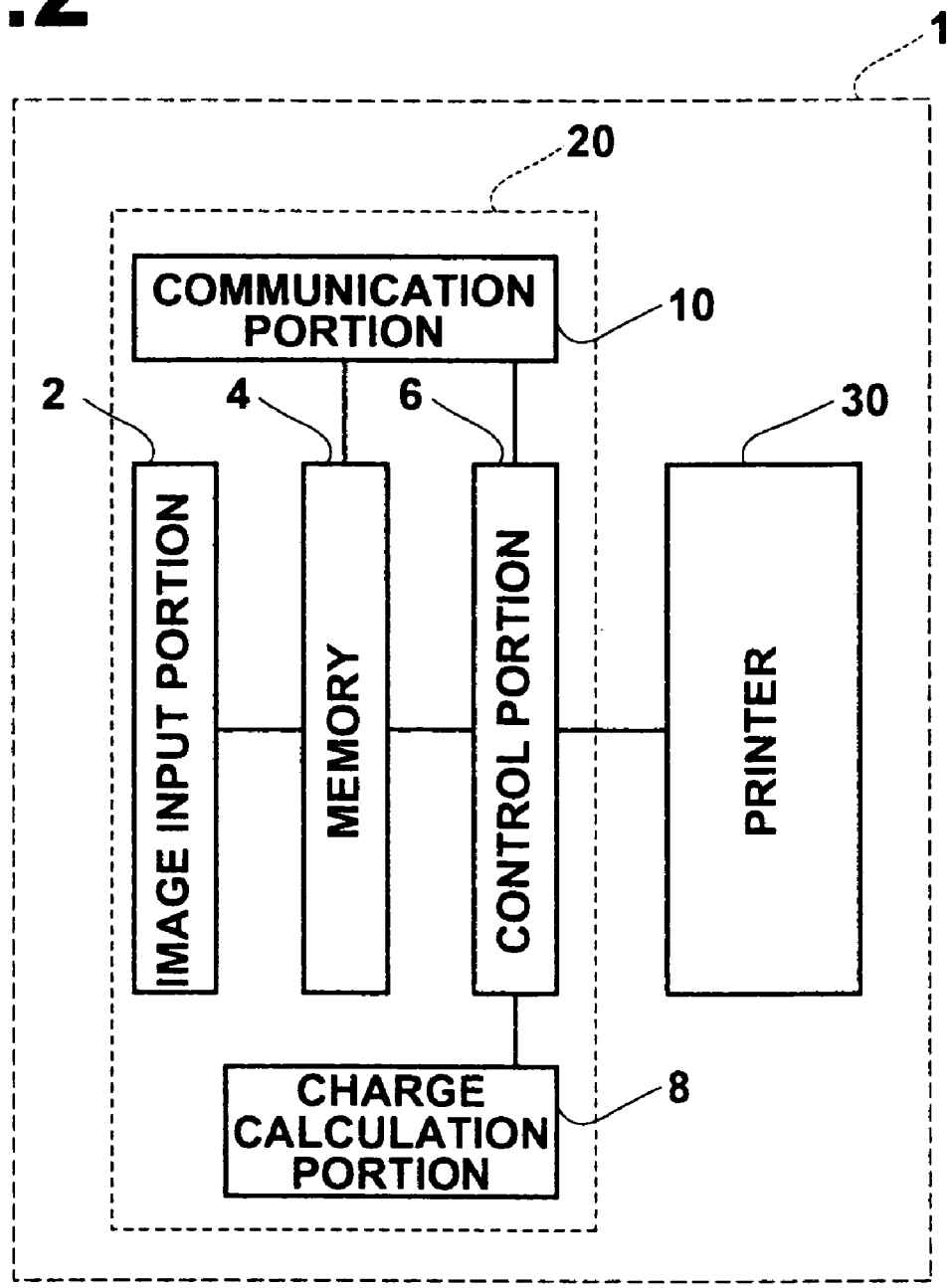
FIG. 2 is a block diagram showing the configuration of a laboratory of the printing system shown in FIG. 1.

FIG. 2 is a block diagram showing the configuration of a laboratory 1 of the printing system shown in FIG. 1. As shown in FIG. 2, the laboratory 1 comprises: a computer 20 and a printer 30. The computer 20 comprises: a communication portion 10 for communicating with the management server 100; an image input portion 2 for receiving input of photographic images of events; a memory portion 4 for storing the input photographic images; a control portion 6 for uploading the photographic images which are stored in the memory portion 4, causing the printer 30 to print the photographic images according to output commands received via the communication portion 10, and causing a charge calculation portion 8 to calculate charges based on the contents of printing; and the charge calculation portion 8 for performing charge calculations according to commands from the control portion 6. The printer 30 prints photographic images of events according to commands from the control portion 6. The printer may be directly connected to the computer 20, or connected thereto via a LAN or the like.

The image input portion 2 is used for importing photographic images of events which occur in the local area of the laboratory 1 to the computer 20. The image input portion 2 is constituted by a scanner for digitizing images photographed on photographic film, hardware interfaces and software for importing digital images photographed by a digital camera, and the like.

The output commands from the management server 100 include data representing the contact information of a user and data specifying the laboratory which has uploaded the photographic images to be output, in addition to data necessary for printing, such as the photographic images specified by the user, the print sizes thereof, and the number of prints. The charge calculation portion 8 performs calculation of charges billed to the user based on the contents of printing (number of prints, print size, etc.). In the case that the photographic images to be printed have been uploaded by another laboratory 1, the chare calculation portion 8 also performs calculation of the royalties to be paid to the other laboratory 1.

Figure 3:
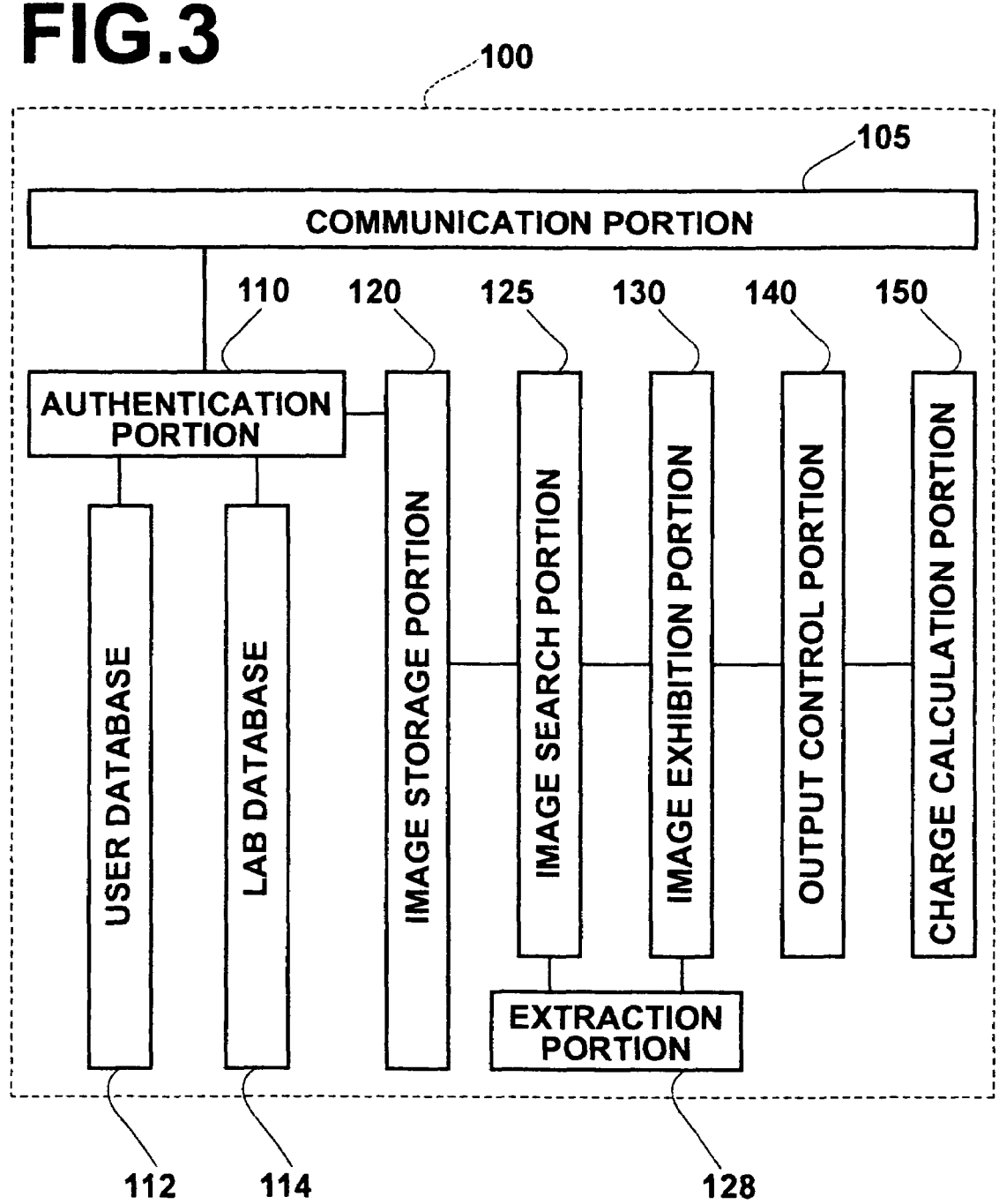
FIG. 3 is a block diagram showing the configuration of a management server of the printing system of FIG. 1.

FIG. 3 is a block diagram showing the configuration of the management server 100 of the printing system of FIG. 1. As shown in FIG. 3, the management server 100 of the printing system according to the present embodiment comprises: a communication portion 105 for communicating with the laboratories 1 and the Internet television sets 50; an authentication portion for authenticating the laboratories 1 and users who access the management server 100 via the Internet television sets 50; a user database 112 for recording user data (such as names, addresses, telephone numbers, user ID's and passwords); a laboratory database 114 for recording laboratory data (such as addresses, telephone numbers, laboratory ID's, and passwords); an image storage portion 120 for recording the photographic images of events which have been uploaded by the laboratories 1, for each of the laboratories 1; an image search portion 125 for locating photographic images which have been uploaded by laboratories 1 having addresses that match areas indicated by zip codes transmitted from the Internet television sets 50; an extraction portion 128 for extracting photographic images in which specific people are pictured, from among the photographic images located by the image search portion 125, in the case that photographic images of the specific people's faces have been transmitted from the Internet television sets 50; an image exhibition portion 130 for administering reduction processes on the photographic images located by the search portion 125 (in the case that a photographic image of a person's face was not transmitted) or the photographic images extracted by the extraction means 128 (in the case that a photographic image of a person's face was transmitted) and transmitting the reduced images obtained thereby to the Internet television sets 50 via the communication portion 105, along with data regarding each of the laboratories 1; an output control portion 140 for generating output commands for printing original images, which have been selected by users from among the reduced images transmitted to the Internet television sets 50 from the image exhibition portion 130, and transmitting the generated output commands to laboratories 1, which have been selected by the users from among the data regarding each of the laboratories 1, to cause printing to be performed thereat; and a charge calculation portion 150 for calculating charges according to the contents of the output commands. Here, the charge calculation portion 150 of the management server 100 calculates fees to be paid to the laboratories 1 which have uploaded the photographic images to be printed and the laboratories 1 that perform printing.

Figure 4:
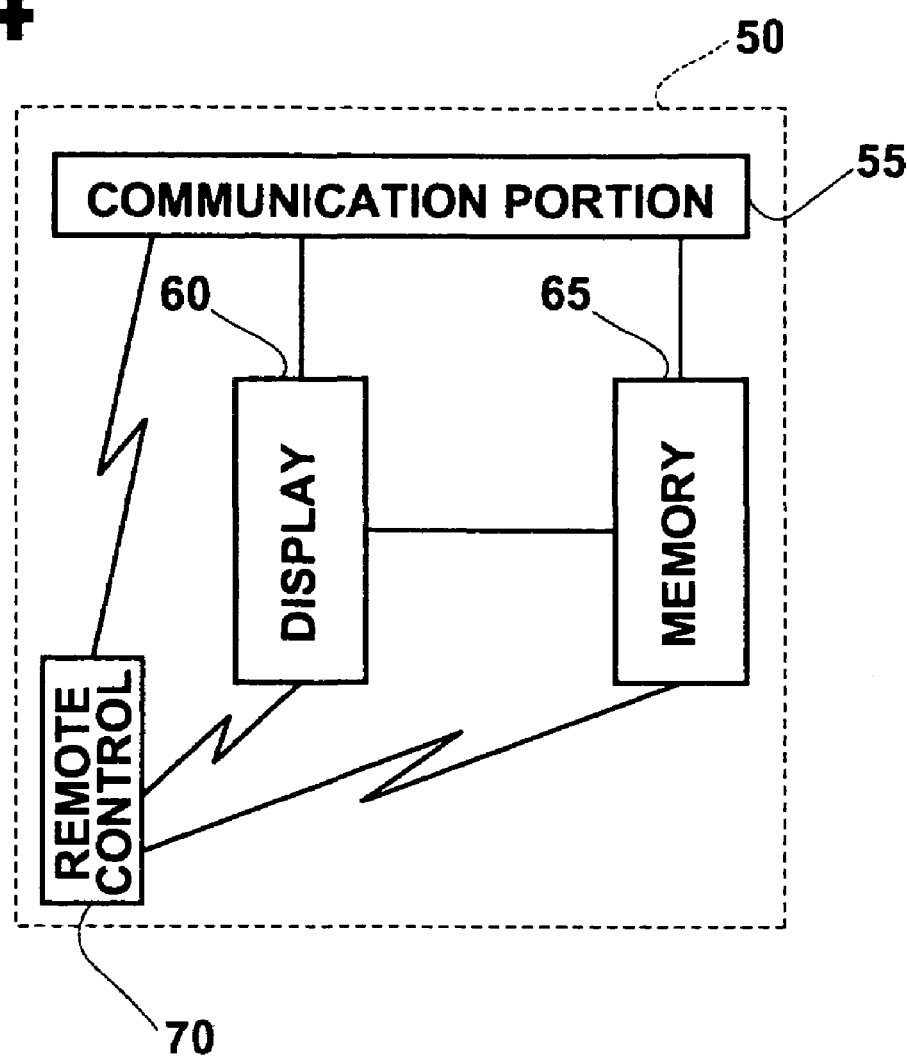
FIG. 4 is a block diagram showing the configuration of an Internet television set of the printing system of FIG. 1.

FIG. 4 is a block diagram showing the configuration of an Internet television set 50 of the printing system of FIG. 1. As shown in FIG. 4, the Internet television set 50 comprises: a remote control 70 for performing operations such as control operations for the Internet television set 50 and input operations; a communication portion 50 for communicating with the management server 100; a television monitor that serves as a display portion 60; and a memory portion 65 for recording data such as imported images. Note that it is assumed that photographic images of the faces of target subjects (for example, all of the members of a user's family) are recorded in the memory portion 65 in advance.

Figure 5:
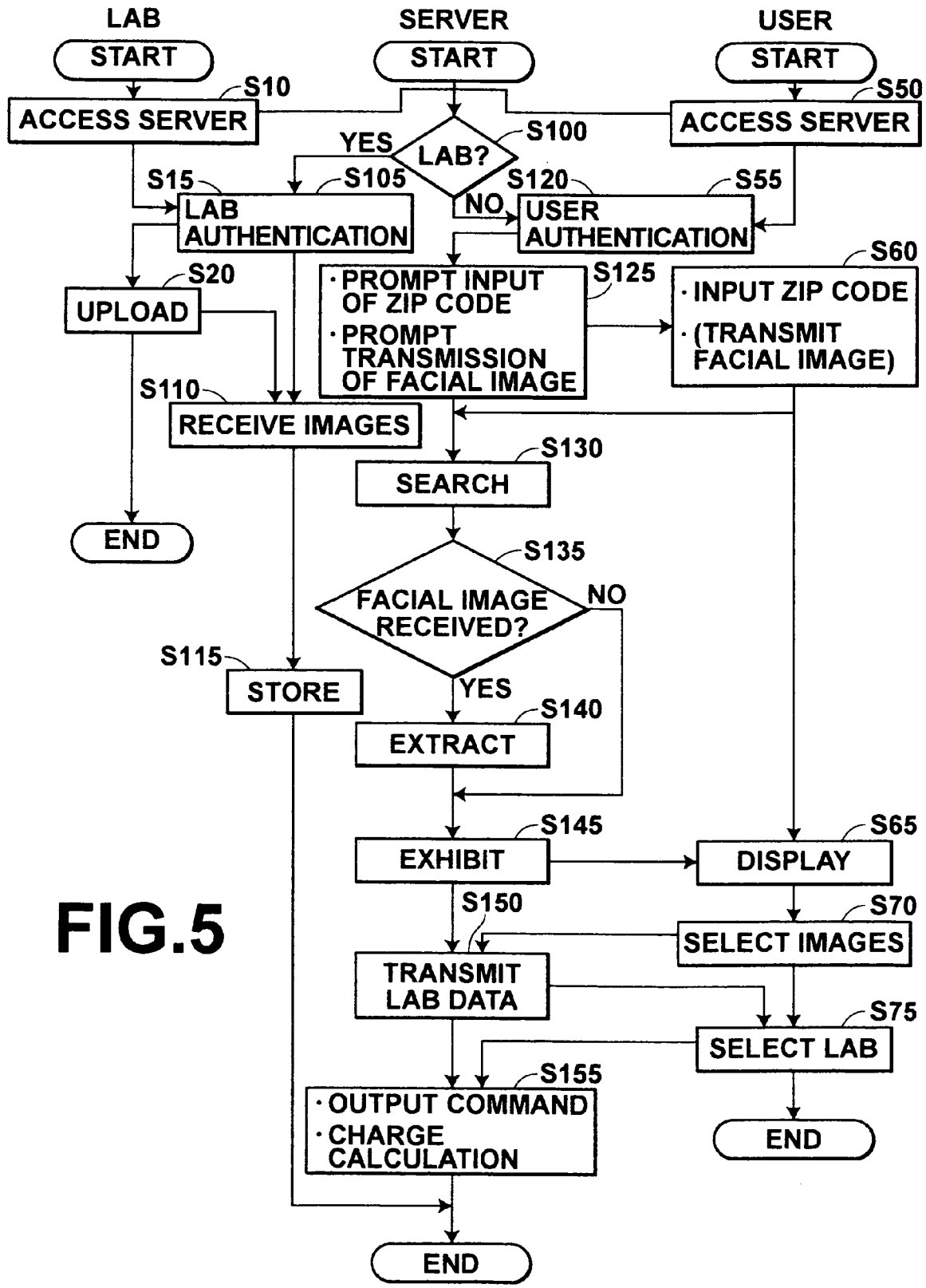
FIG. 5 is a flow chart illustrating the operations of the printing system of FIG. 1.

Next, the operation of the printing system of the present embodiment will be described in detail, with reference to the flow charts of FIG. 5 and FIG. 6.

First, the operations of a laboratory 1 and the management server 100 during uploading of photographic images of events will be described. As shown in FIG. 5, when the laboratory 1 uploads photographic images, the laboratory 1 accesses the management server 100 from the computer 20 (S10, S100: Yes), and an authentication process is performed (S15, S105). Here the authentication process differs for registered laboratories and unregistered laboratories. The authentication portion 110 of the management server 100 prompts an unregistered laboratory 1 to input its address, telephone number and the like. The authentication portion 110 sets a password for and issues a laboratory ID to the laboratory 1, then records the address, telephone number, the laboratory ID and the password in the laboratory database 114. The authentication portion 110 prompts a registered laboratory 1 for its laboratory ID and password, to perform authentication. After authentication (or registration) is complete, the laboratory 1 uploads photographic images of events to the management server 100 (S20), and the processes performed at the laboratory 1 end. Meanwhile, the management server 100 receives the photographic images of events uploaded by the laboratory 1 (S110). The management server 100 stores the photographic images, correlated with the laboratory ID, in the image storage portion 120, and the processes performed at the management server 100 end. Note that as shown in FIG. 7, the image storage portion 120 stores the photographic images of events separately for each laboratory and for each event.

Figure 8A:
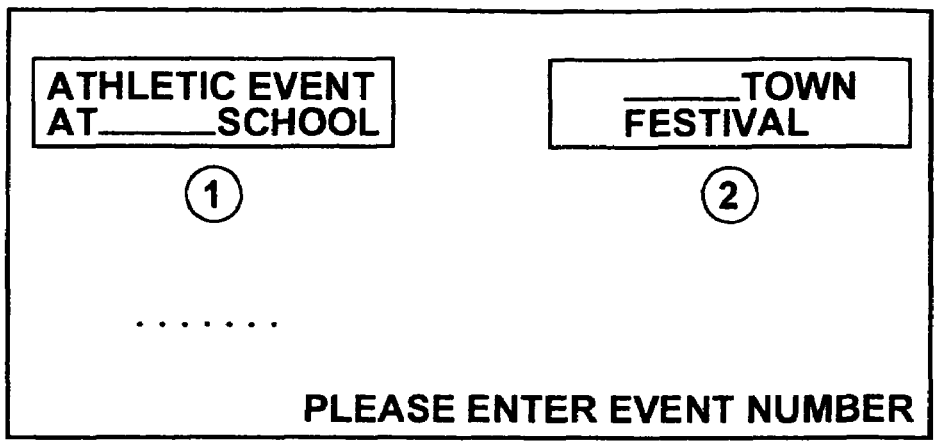
FIG. 8A, FIG. 8B, and FIG. 8C show examples of a screen displayed at an Internet television set.
Figure 8B:
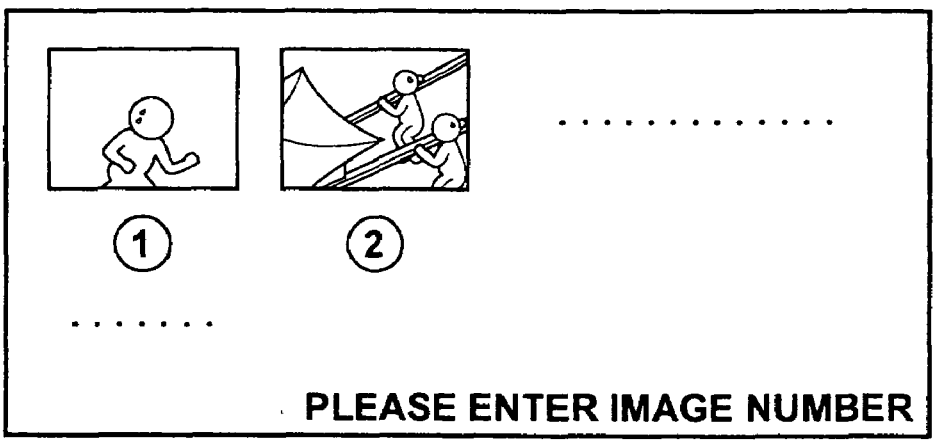
Figure 8C:
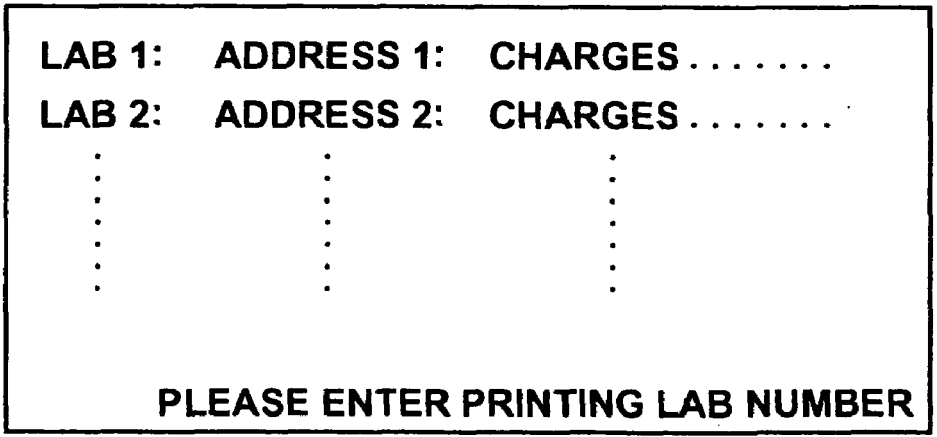

Step S50 through step S75 illustrate the processes performed at an Internet television set 50 when ordering prints. Step S120 through step 155 illustrate the print order reception operations of the management server 100. As shown in FIG. 5, when a user orders prints, he switches the Internet television set 50 to a channel provided by the management server 100 by using the remote control 70, thereby accessing the management server 100 (S50, S100: No). Then, the authentication portion 110 of the management server 100 performs a user authentication process (S55, S120). The authentication process differs for registered users and unregistered users, in a similar manner to the authentication process for the laboratories. The authentication portion 110 of the management server 100 prompts an unregistered user to input his address, telephone number and the like. The authentication portion 110 sets a password for and issues a user ID to the user 1, then records the address, telephone number, the user ID and the password in the user database 112. The authentication portion 110 prompts a registered user 1 for his user ID and password, to perform authentication. After authentication (or registration) is complete, the image search portion 125 of the management server transmits a message to the Internet television set 50 (S125). The message transmitted from the image search portion prompts input of the zip code of an area in which an event was held, of which the user desires photographic images, and transmission of a photographic image of the face of a target subject. The message is displayed on the display portion 60 of the Internet television set 50. The user inputs the zip code of a desired area using the remote control 70, according to the message displayed on the display portion 60. In the case that a photographic image of a face is to be transmitted at this time, the user selects a photographic image of a face from among the photographic images of faces recorded in the memory portion 65 using the remote control 70, and transmits it to the management server 100 (S60). In the case that a photographic image of a face is not to be transmitted, the user inputs only the zip code and transmits it to the management server (S60). The image search portion 125 searches the laboratory database 114 for a laboratory ID of a laboratory having an address that matches the zip code transmitted from the Internet television set 50. Then, the image search portion 125 reads out photographic images of events, which are stored correlated with the located laboratory ID, in the image storage portion 120 (S130). Here, in the case that a photographic image of a face has not been transmitted from the Internet television set 50 (S135: No), the image search portion 125 outputs the photographic images read out in step S130 to the image exhibition portion 130. In the case that a photographic image of a face has been transmitted (S135: Yes), the image search portion 125 transmits the photographic images read out in step S130 to the extraction portion 128. The extraction portion 128 performs facial extraction processes on the photographic images output thereto from the image search portion 125. Then, by performing pattern matching between the extracted facial images and the photographic image of the face which has been transmitted from the Internet Television set 50, the extraction portion 128 specifies photographic images of the events in which the target subject is pictured. The photographic images specified by the extraction portion 128 are output to the image exhibition portion 130 (S140). The image exhibition portion 130 administers reduction processes on the images output thereto from either the image search portion 125 or the extraction portion 128. Then, the image exhibition portion 130 transmits the reduced images obtained thereby to the Internet television set 50 (S145). The transmitted reduced images are displayed on the display portion 60 of the Internet television set 50 (S65). The user selects images that he desires as prints, from among the displayed reduced images, using the remote control 70, and transmits his selection to the management server 100 (S70). Then, the image exhibition portion 130 of the management server 100 reads out data regarding the locations of each of the laboratories 1 from the laboratory database 114. The read out data is transmitted to the Internet television set 50, to cause the user to select a laboratory 1 to perform printing (S150, S75). In the above operation, the image exhibition portion 130 may transmit the reduced images to the Internet television set 50 without administering any processes thereon. However, it is desirable to transmit the reduced images arrange in a hierarchical structure as shown in FIG. 8A and FIG. 8B, for the sake of convenience in user selection. That is, first, the user is prompted to select an event from among the events held in the user specified area (FIG. 8A). Next, the user is prompted to select images from among the images of the selected event. Note that although not shown in the figures, printing settings such as number of prints and print sizes are set at the same time that the images are selected. The laboratory data is laid out as shown in FIG. 8C, for example.

When selection of a laboratory to perform printing (S75) is complete, the processes performed at the Internet television set 50 end. At this time, the output control portion 140 generates an output command for causing the images selected by the user using the Internet television 50 to be printed. Then, the output control portion 140 transmits the output command to the laboratory 1 selected by the user. At the same time, the charge calculation portion 150 calculates fees to be paid to the laboratory 1 which has uploaded the selected images and the laboratory 1 that performs printing (S155), and the processes performed at the management server 100 end. Note that the contents of the output command include: data regarding the user who ordered the prints (address, telephone number, etc.); the original photographic images corresponding to the reduced images selected by the user; number of prints; print sizes; and data regarding the laboratory 1 that uploaded the photographic images to be printed (address, telephone number, etc.).

Figures 6, 7:
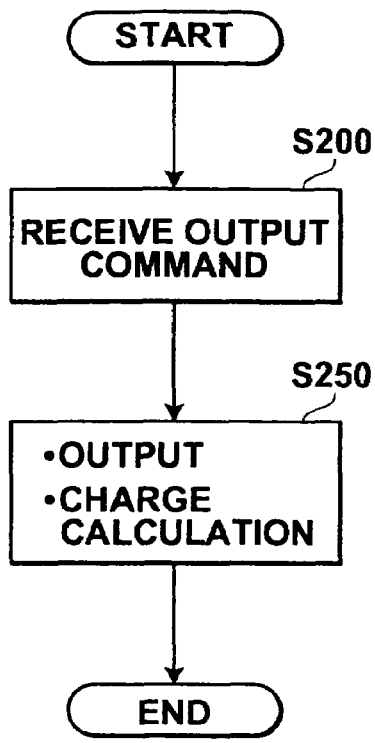
FIG. 6 is a flow chart illustrating the printing operation of the laboratory of FIG. 2
FIG. 7 shows an example of the manner in which photographic images of events, which are stored in an image storage means of the management server of FIG. 3, are arranged.

FIG. 6 is a flow chart illustrating the procedures performed when the laboratory 1 receives the output command form the management server 100 and performs printing. As shown in FIG. 6, the laboratory 1 receives the output command from the management server 100 via the communication portion 10 of the computer 20 (S200). Upon receipt of the output command, the control portion 6 causes the printer 30 to print the photographic images included in the output command according to the number of prints and print sizes also included in the output command. At the same time, the charge calculation portion 8 of the laboratory 1 charges the user for printing, based on the user data included in the output command (S250) Note that in the case that the printed photographic images were uploaded by another laboratory 1, the charge calculation portion 8 also performs processes for paying the royalty fees to the other laboratory 1.

Figure 9:
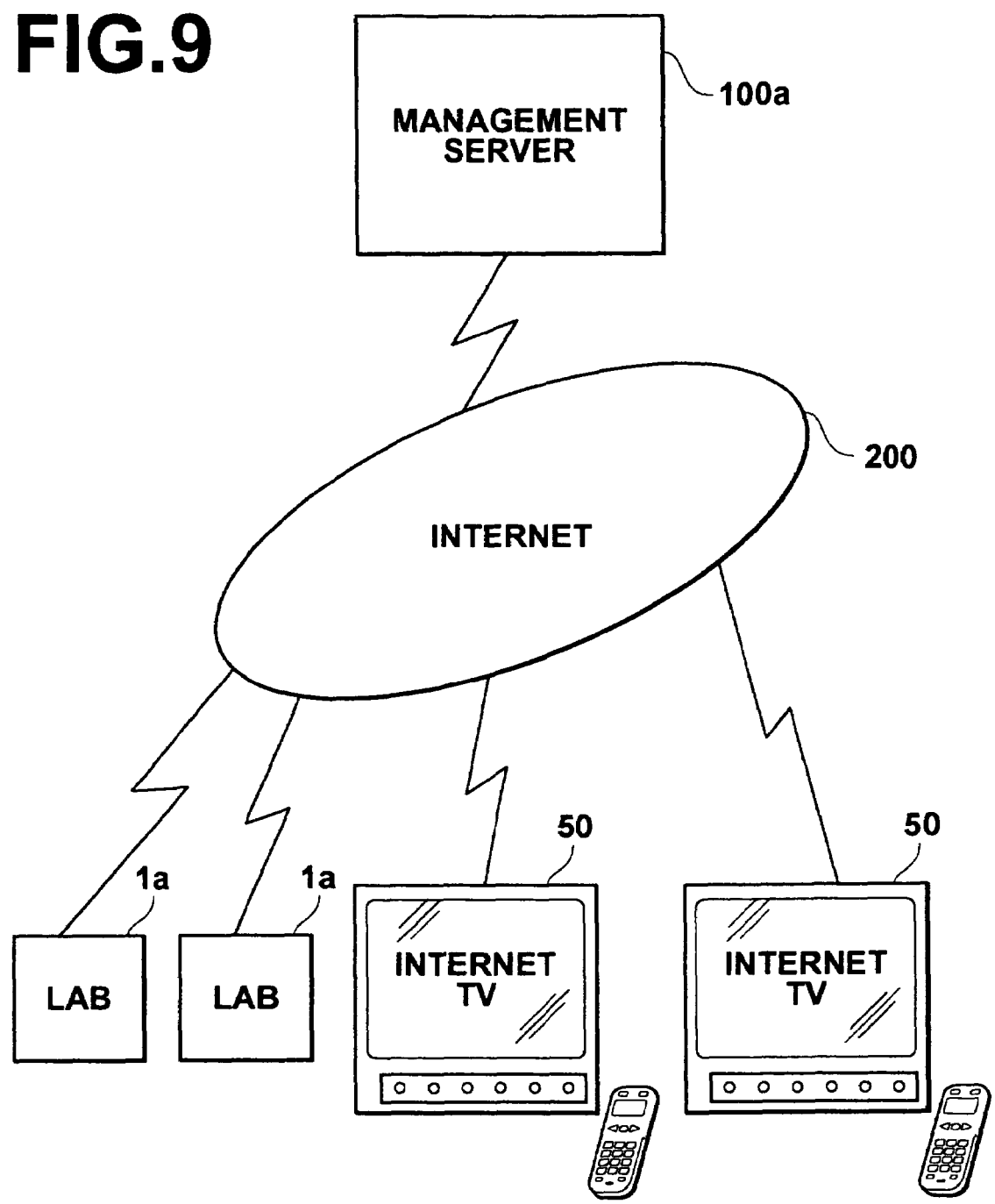
FIG. 9 is a block diagram illustrating the construction of a printing system as a second embodiment of the present invention.

FIG. 9 is a block diagram illustrating the construction of a printing system as a second embodiment of the present invention. Note that the printing system of the second embodiment is a modification of the printing system of the first embodiment, which is further convenient for use in the case that a single event includes a plurality of sub-events. Here, detailed descriptions will be given only for components that differ from the printing system shown in FIG. 1. Components which are common to the printing system of the first embodiment shown in FIG. 1 are denoted by the same reference numerals, and detailed descriptions thereof are omitted. As shown in FIG. 9, the printing system of the second embodiment comprises: a plurality of laboratories 1*a* for uploading photographic images of events that occur in their local areas to a management server 100*a*, and for outputting photographic images as prints according to output commands from the management server 10*a*; Internet television sets 50 that serve as order terminals at which users order prints of photographic images of events via the management server; and the management server 100*a*, for storing the photographic images of the events which are uploaded from each of the laboratories 1*a*, receiving printing orders from users via the Internet television sets 50 regarding the stored photographic images, and transmitting output commands to the laboratories 1*a* according to the contents of the printing orders to cause the photographic images to be printed. The laboratories 1*a*, the Internet television sets 50, and the management server 100*a* are connected by the Internet 200.

Figure 10:
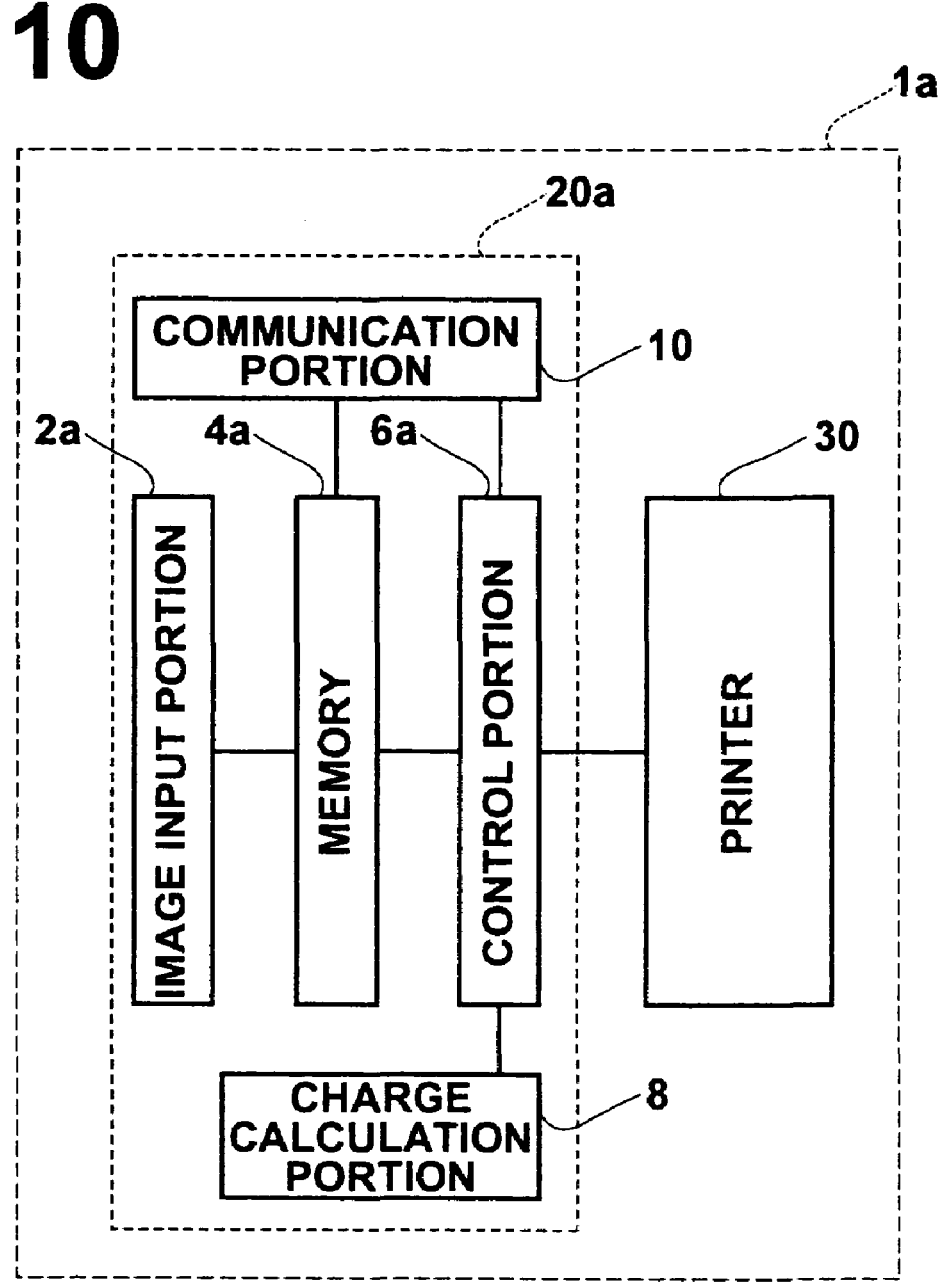
FIG. 10 is a block diagram illustrating the construction of a laboratory of the printing system of FIG. 9.

FIG. 10 is a block diagram showing the configuration of a laboratory 1*a* of the printing system shown in FIG. 9. As shown in FIG. 10, the laboratory 1*a* comprises: a computer 20*a* and a printer 30. The computer 20*a* comprises: a communication portion 10 for communicating with the management server 100*a*; an image input portion 2*a* for receiving input of photographic images of events; a memory portion 4*a* for storing the input photographic images; a control portion 6*a* for uploading the photographic images which are stored in the memory portion 4*a*, causing the printer 30 to print the photographic images according to output commands received via the communication portion 10, and causing a charge calculation portion 8 to calculate charges based on the contents of printing; and the charge calculation portion 8 for performing charge calculations according to commands from the control portion 6*a*. The printer 30 prints photographic images of events according to commands from the control portion 6*a*. The printer may be directly connected to the computer 20*a*, or connected thereto via a LAN or the like.

The image input portion 2*a* is used for importing photographic images of events which occur in the local area of the laboratory 1*a* to the computer 20*a*. The image input portion 2*a* is also used to input event programs (the names of each sub-event that constitute the event and the times of the sub-events), as well as to input the sub-events, to which each photographic image of the event are correlated. The importing of the photographic images of events is realized by a scanner for digitizing images photographed on photographic film, hardware interfaces and software for importing digital images photographed by a digital camera, and the like. The input of event programs and the like is realized by an input device such as a keyboard.

For example, with respect to an event "Athletic Event at Elementary School A", the image input portion 2*a* imports 150 photographic images of the event (image 1, image 2, . . . , image 150) to the computer 20*a*. At the same time, the program of the athletic event (9:00–9:30 opening ceremony; 9:30–10:00 basketball; . . . ; 15:00–15:30 closing ceremony), as well as the correlation among the photographic images of the events and the sub-events (image 1-image 15: opening ceremony; image 16-image 34: basketball; . . . ; image 140-image 150: closing ceremony) are input via an input device such as a keyboard (not shown).

The memory portion 4*a* of the laboratory 1*a* records the photographic images of the event, which have been input by the image input portion 2*a*, corresponding to each sub-event, as well as the event program. FIGS. 11A and 11B show examples of data uploaded by the laboratory of FIG. 10. As shown in FIGS. 11A and 11B, the memory portion 4*a* of the computer 20*a* at the laboratory 1*a* records the event program in addition to the photographic images of the event corresponding to the sub-events. Hereinafter, the data representing the event program (FIG. 11A) will be referred to as data A, and the photographic images of the event, which have been correlated with the sub-events, will be referred to as data B.

Here, both data A and data B are manually input by an operator of the computer 20*a* via the image input portion 2*a*. However, the data B may be automatically generated by the image input portion 2*a*, taking advantage of the fact that the photography time/date data is attached to the photographic images as tag information. That is, the data A, which represents the event program, may be manually input. Then, the image input portion 2*a* judges to which sub-event each photographic image is correlated, based on the photography time/date data included in the tag information of the imported photographic images of the event (in the example above, 150 photographic images) and the event program, represented by the data A.

The control portion 6*a* transmits the data A, which represents the event program, along with the data B, which represents the photographic images of the event, to the management server 100*a*, when uploading photographic images of a single event.

Figure 12:
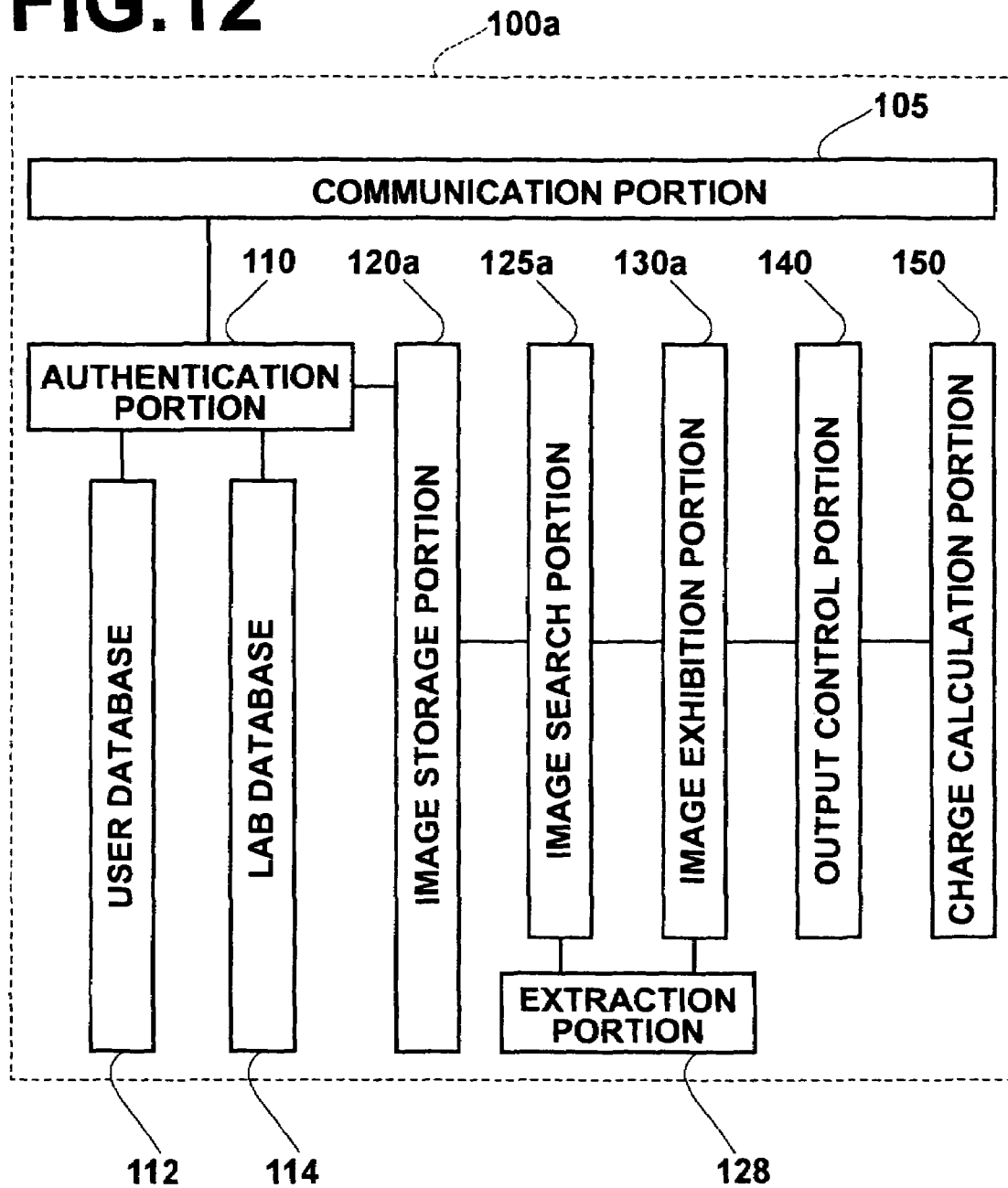
FIG. 12 is a block diagram illustrating the construction of a management server of the printing system of FIG. 9.

FIG. 12 is a block diagram illustrating the construction of the management server 100*a* of the printing system of FIG. 9. As shown in FIG. 12, the management server 100*a* differs from the management server 100 of FIG. 3 only in that an image storage portion 120a, an image search portion 125a, and an image exhibition portion 130a differ from the image storage portion 120, the image search portion 125, and the image exhibition portion 130, respectively. Here, detailed descriptions will be given regarding the image storage portion 120a, the image search portion 125a, and the image exhibition portion 130a.

The image storage portion 120a of the management server 100a stores data of photographic images of events separately for each laboratory 1a (to be more precise, for each ID of the laboratory 1a). FIG. 13 shows an example of the manner in which photographic images of events, which are stored in an image storage portion 120a, are arranged. As shown in FIG. 13, the image storage portion 120a stores data A, which represents an event program, and data B, which represent the photographic images of an event, separately for each laboratory 1a and for each event. Note that here, the data A and the data B are transmitted from the laboratory 1a. Alternatively, the laboratory need not generate the data B. In this case, the laboratory 1a transmits the data A, which represents the event program, and all of the photographic images of the event (in the above example, 150 photographic images) to the management server 100a. Then image storage portion 120a of the management server 100a judges to which sub-event each photographic image is correlated, based on the photography time/date data included in the tag information of the transmitted photographic images of the event (in the example above, 150 photographic images) and the event program, represented by the data A. In this manner, the image storage portion 120a automatically generates the data B and stores it therein.

The image search portion 125a searches for a laboratory ID of a laboratory 1a (in the case that a plurality of laboratories 1a qualify, a plurality of laboratory ID's), which has an address that matches a zip code transmitted from an Internet television set 50, by referring to the laboratory database DB114. Then, the data A and the data B for photographic images of events, which are recorded in the image storage portion 2a correlated with the laboratory ID, are read out and output to the image exhibition portion 130a.

Figure 14:
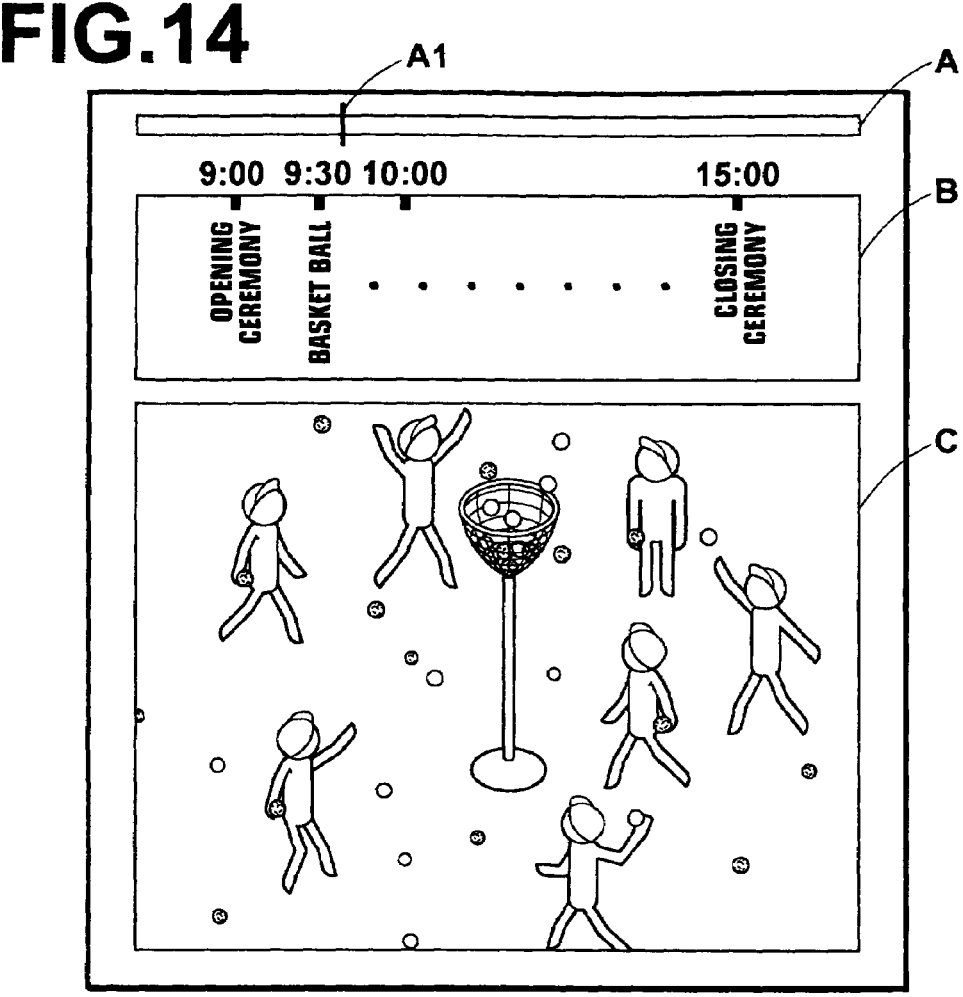
FIG. 14 shows a first example of a screen displayed at an Internet television set.

The image exhibition portion 130a first transmits a list of all of the events provided by the image search portion 125a to the Internet television set 50, as shown in FIG. 8A. When the user selects a desired event from the list via the Internet television set 50, the image exhibition portion 130a transmits data A, which represents an event program of the selected event, to the Internet television set 50. Then, the user selects desired sub-events from the event program and transmits sub-event specifying data via the Internet television set 50. Thereafter, the image exhibition portion 130a reads out images of the sub-event, specified by the sub-event specifying data, from the data B provided by the image search portion 125a, and transmits them to the Internet television set 50 for display thereat. FIG. 14 shows a screen of the Internet television set 50, in which the event program and the photographic images of the event shown in FIGS. 11A and 11B are displayed. As shown in FIG. 14, the image exhibition portion 130a divides the screen of the Internet television set 50 into three regions. The three regions are: a time selecting region A; a program display region B; and an image display region C. A cursor A1, movable in the horizontal direction by the user with the remote control 70 of the Internet television set 50, is provided in the time selecting region A. The program display region B displays the event program in such a manner so that times and sub-events are sequentially displayed in the horizontal direction. Here, the position of the cursor A1 (the time of the sub-event) corresponds to the sub-event specifying data for specifying a sub-event. The image exhibition portion 130a exhibits the photographic images of the event by displaying photographic images of the sub-events that were held at the time indicated by the position of the cursor A1, which is controlled by the remote control 70. The photographic images of the sub-events are displayed in the image display region C. In FIG. 14, the cursor A1 has been moved by the user to a time corresponding to "basketball" (9:30–10:00). Therefore, the image exhibition portion 130a displays photographic images of the event picturing the sub-event "basketball" in the image display region C. Note that in the example shown in FIG. 14, only one photographic image of the event that corresponds to the time indicated by the cursor A1 is displayed. However, a construction may be adopted wherein a plurality of images corresponding to times in the vicinity of the time indicated by the cursor A1 are displayed.

In this manner, in the printing system of the present embodiment, the image exhibition portion 130a of the management server 100a transmits photographic images of the sub-events, which are specified by the sub-event specifying data (in this case, the times of the sub-events) transmitted from the user, to the Internet television set 50. Therefore, the user can expedite his/her search of photographic images of the event in which he/she is interested in, which is convenient.

Figure 15:
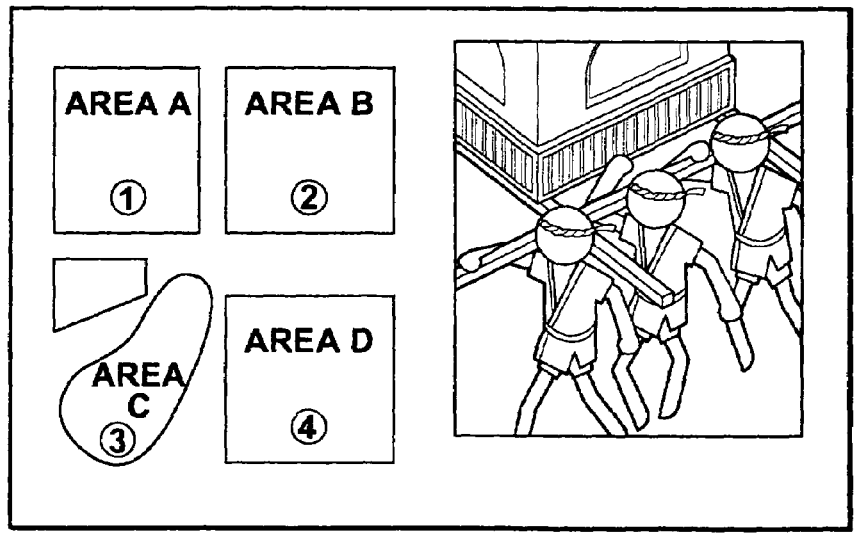
FIG. 15 shows a second example of a screen displayed at an Internet television set.

Note that in the printing system of the present embodiment, the times of the sub-events were employed as the sub-event specifying data. However, in the case that the event is of a type wherein different sub-events are held simultaneously at different locations, such as a festival in a large town, then photography locations may be employed as the sub-event specifying data. In this case, the image exhibition portion 130a of the management server 100a displays a screen shown in FIG. 15 at the Internet television set 50, for example. FIG. 15 shows a screen of the Internet television set 50, wherein a map of the town (in which areas where sub-events are held are denoted with numbers) is displayed on the left side of the screen. Photographic images of the event, which picture sub-events held at an area specified by the user via the remote control 70, are displayed on the right side of the screen. In this case, it is necessary for the image storage portion 120a of the management server 100a to record each photographic image of the event, correlated with the area of the sub-event which is pictured therein. The management server 100a may obtain the photography location of the photographic images by analyzing GPS data included in the tag information thereof to perform the correlation. Alternatively, the laboratory 1a may upload the areas of the sub-events which are pictured in the photographic images of the event, when uploading the photographic images of the event.

Preferred embodiments of the photographic image service system according to the present invention have been described. However, the present invention is not limited to the above embodiments, and various modifications are possible within the scope of the invention.

Figure 16A:
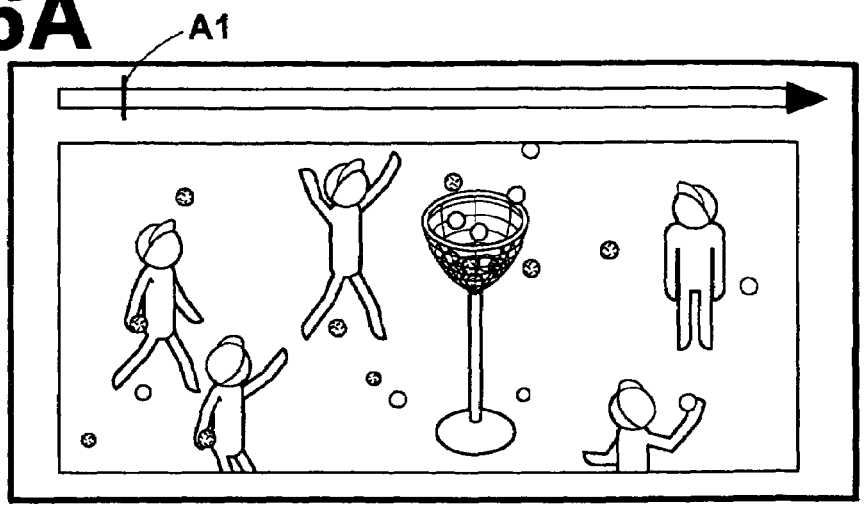
FIGS. 16A, 16B, and 16C show examples of a screen displayed at an Internet television set.

For example, Internet television sets were employed as the order terminals in the printing system of the above embodiment. However, any terminal device may be employed as the order terminal of the photographic image service system of the present invention, as long as it is capable of accessing the management server and performing ordering operations for the photographic images of events. Examples of such terminal devices include, but are not limited to, personal computers (PC's) and cellular telephones. The manner in which images are displayed may be altered depending on the characteristics of the order terminal when exhibiting the photographic images of the events. For example, a keyboard, a mouse, and the like are input devices of a personal computer, which facilitates operations such as selection of photographic images of events and specification of sub-events. However, in the case that the order terminal is the Internet television set, only the remote control is available as an input device. Therefore, the server may sort the photographic images of the event in temporal sequence, based on the photography times thereof, and cause a screen shown in FIG. 16A to be displayed at the Internet television set, for example. In the screen shown in FIG. 16, a cursor A1 is provided at the top of the screen, and photographic images of the event, which were obtained at times that correspond to the position of the cursor A1, are displayed. Specifically, if the user presses a "Forward" button on the remote control, the cursor A1 moves in the direction of the arrow. Thereby, the photographic image of the event, which had been displayed prior to movement of the cursor A1, is replaced by an image, which was photographed after it.

Figure 16B:
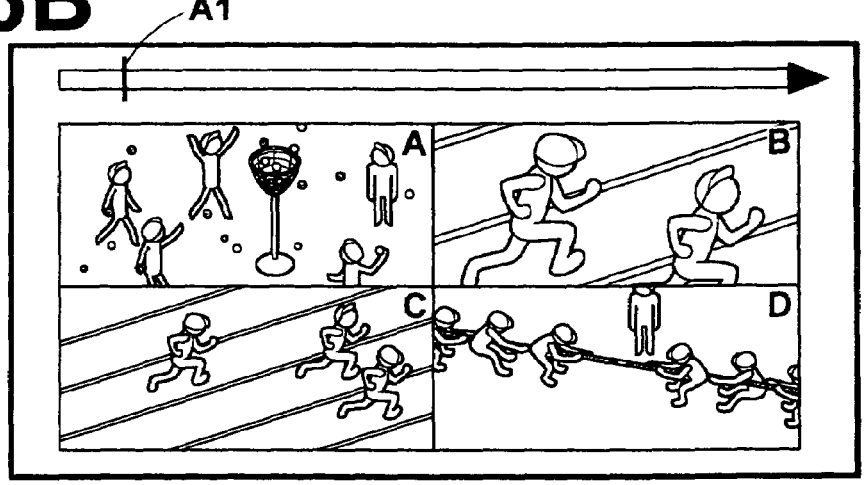
Figure 16C:
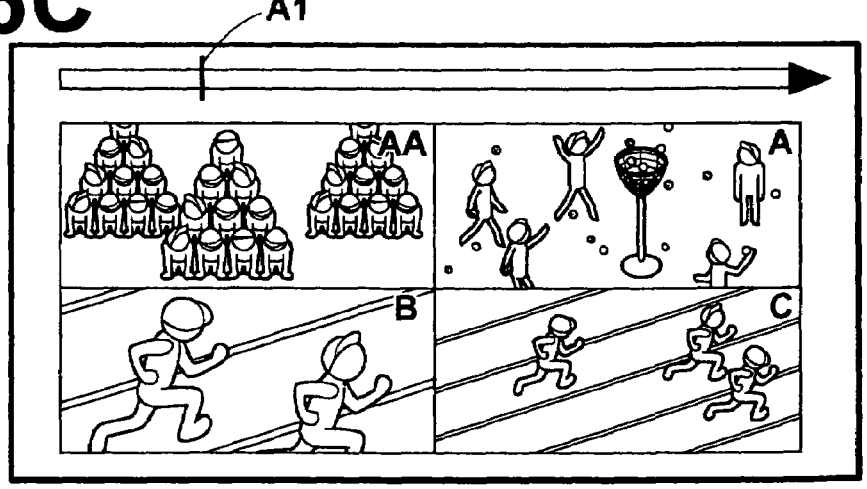

Alternatively, a plurality of images (four images in FIG. 16B) maybe displayed simultaneously, as shown in FIG. 16B. In this case as well, the photographic images which are displayed may be switched according to the position of the cursor A1. Note that the displayed photographic images may be switched either one at a time, or a plurality at a time. Specifically, when the "Forward" button of the remote control is pressed and the cursor A1 moves in the forward direction, the four displayed photographic images may be replaced by four other photographic images, which were photographed after the original four. Alternatively, when the "Forward" button is pressed, the photographic image having the earliest photography time among the four displayed photographic images (for example, image D in FIG. 16B) may be replaced by a photographic image (image AA in FIG. 16C), which was photographed after the photographic image having the latest photography time (image A in FIG. 16B). Thereby, a screen shown in FIG. 16C is displayed at the Internet television set.

In the case that a plurality of photographic images are simultaneously displayed as shown in FIG. 16B, a cursor may be provided in the display regions for each image (images A, B, C, and D in FIG. 16B). The image for which the cursor has been operated may be switched.

A construction may be adopted wherein the user is enabled to select from among the different display manners described above. In this case, the images are displayed in the display manner selected by the user.

The movement operation of the cursor is not limited to the "Forward" and "Back" buttons. Functions for moving the cursor may be assigned to desired buttons of the remote control. In this case, the model of the remote control may be obtained by an infrared communication function between the remote control and the Internet television set. Then, the operation modes of the remote control may be displayed on the screen, for ease of use by the user.

In the printing systems of the embodiments described above, the photographic images of the user's face, which serve as characteristic images, are recorded in the Internet television set in advance, to be transmitted to the management server. However, it is not necessary for the subject specifying means of the order terminal (the means for transmitting the characteristic image to the management server) to be contained in the same housing as other components of the order terminal, such as the display means. For example, in response to a prompt to transmit characteristic images from the management server when accessing the management server from the Internet television set, the user may transmit the characteristic images using a device which has communication functions (such as a personal computer, a cellular telephone, etc.) other than the Internet television set. The characteristic images may be transmitted as attachments to e-mail messages. In this case, the management server causes the user to register his/her e-mail address during the user registration process. The management server is then configured to receive attachments to e-mail messages transmitted from e-mail addresses which correspond to the user ID's of authenticated users. Further, it is not necessary that the characteristic images are recorded in the subject specifying means in advance. For example, a cellular telephone with built in camera may be employed as the subject specifying means. In this case, when the user is prompted to transmit characteristic images from the management server, the subject may be photographed, then the characteristic image may be transmitted to the management server. In this manner, the characteristic image is enabled to be transmitted expediently, even if it is not recorded in advance, and the desired photographic images of the event may be obtained conveniently.

The characteristic image is not limited to that in which one subject is pictured. The characteristic image may picture a plurality of subjects, for example, faces of a plurality of people. In this case, the management server may search for and exhibit photographic images of the event, in which a desired subject from among those pictured in the characteristic image is pictured. Alternatively, the management server may search for and exhibit only those photographic images of the event, in which all of the subjects pictured in the characteristic image are pictured.

In addition, the present invention was described as printing systems in the above embodiments, for the sake of facilitating understanding thereof. However, the services provided by the photographic image service system of the present invention are not limited to the provision of prints. The photographic images of events may be provided on recording media such as CD-R's.

Further, in the printing system of the above embodiments, the management server does not perform image processes to improve the image qualities of the images uploaded thereto from the laboratories. However, means for performing optional functions, such as color correction processes, red-eye removal processes, and size conversion processes, may be provided in the management server.

Still further, the manner in which charges are calculated is not limited to the example described in the printing systems of the above embodiments. For example, direct calculation of charges performed at the laboratory may be eliminated, and the management server may perform all charge calculation.

What is claimed is:

1. A photographic image service system comprising a plurality of service shops for providing a photographic image service; at least one order terminal; and a management server; all connected via a network, wherein:
    each of the service shops comprises:
    an uploading means for uploading at least one photographic image of an event which occurs in its local area to the management server; and
    an output means for outputting at least one photographic image of the event specified by an output command issued by the management server;

the management server comprises:
- a memory means for recording the at least one photographic image of the event, correlated with area specifying data that specifies an area where the service shop, which has uploaded the at least one photographic image, is located;
- a search means for searching the memory means for the at least one photographic image of the event uploaded by a service shop which is designated by area designating data received from the order terminal;
- an image exhibiting means for transmitting the at least one photographic image found by the search means to the order terminal; and
- an output control means for transmitting output commands that cause at least one photographic image, specified by image specifying data transmitted from the order terminal from among the at least one photographic image of the event transmitted thereto, to be transmitted to a predetermined service shop and output thereat; and each of the at least one order terminal comprises:
- an area designating means for designating an area at which at least one photographic image of an event is obtained, by transmitting area designating data, desired by a user, to the management server;
- a display means for displaying the at least one photographic image transmitted to the order terminal from the management server; and
- an image specifying means for transmitting data that specifies at least one photographic image selected by the user from among the at least one photographic image of the event transmitted to the management server, as the image specifying data.

2. A photographic image service system as defined in claim 1, wherein:
- the event comprises a plurality of sub-events;
- the memory means records the at least one photographic image of the event, correlated with the sub-event at which the photographic image was obtained;
- each of the at least one order terminal further comprises a sub-event specifying means for transmitting sub-event specifying data, which specifies a sub-event desired by a user, to the management server; and
- the image exhibiting means transmits at least one photographic image of an event which was obtained at the sub-event which is specified by the sub-event specifying data, from among the photographic images of the event which were located by the search means.

3. A photographic image service system as defined in claim 2, wherein:
the memory means employs the time/date of photography of the photographic image of the event and the time/date that the sub-event was held, to record the at least one photographic image of the event, correlated with the sub-event at which the photographic image was obtained.

4. A photographic image service system as defined in claim 2, wherein:
the memory means employs the location of photography of the photographic image of the event and the location where the sub-event was held, to record the at least one photographic image of the event, correlated with the sub-event at which the photographic image was obtained.

5. A photographic image service system as defined in claim 1, wherein the image exhibiting means transmits a confirmation image of the at least one photographic image of the event.

6. A photographic image service system as defined in either claim 1 or claim 2, wherein each of the at least one order terminal further comprises:
- a shop selecting means for selecting a service shop at which the at least one photographic image specified by the image specifying means is output; and wherein
- the output control means of the management server causes the service shop selected by the shop selecting means to output the at least one photographic image of the event.

7. A photographic image service system as defined in any one of claim 1, claim 2 and claim 3, wherein:
- each of the at least one order terminal further comprises a subject specifying means for transmitting a characteristic image indicating the characteristics of a target subject;
- the management server further comprises an extracting means for extracting at least one photographic image in which the target subject is pictured, from among the at least one photographic image of the event, based on the characteristic image transmitted from the order terminal; and wherein
- the image exhibiting means transmits only the at least one photographic image in which the target subject is pictured, extracted by the extracting means, to the order terminal.

8. A photographic image service system as defined in claim 4, wherein:
- the target subject is a person; and
- the characteristic image is a photographic image of the person's face.

* * * * *